C. F. FERNALD.
CLAMPING MECHANISM.
APPLICATION FILED MAY 21, 1910.
988,988.
Patented Apr. 11, 1911.
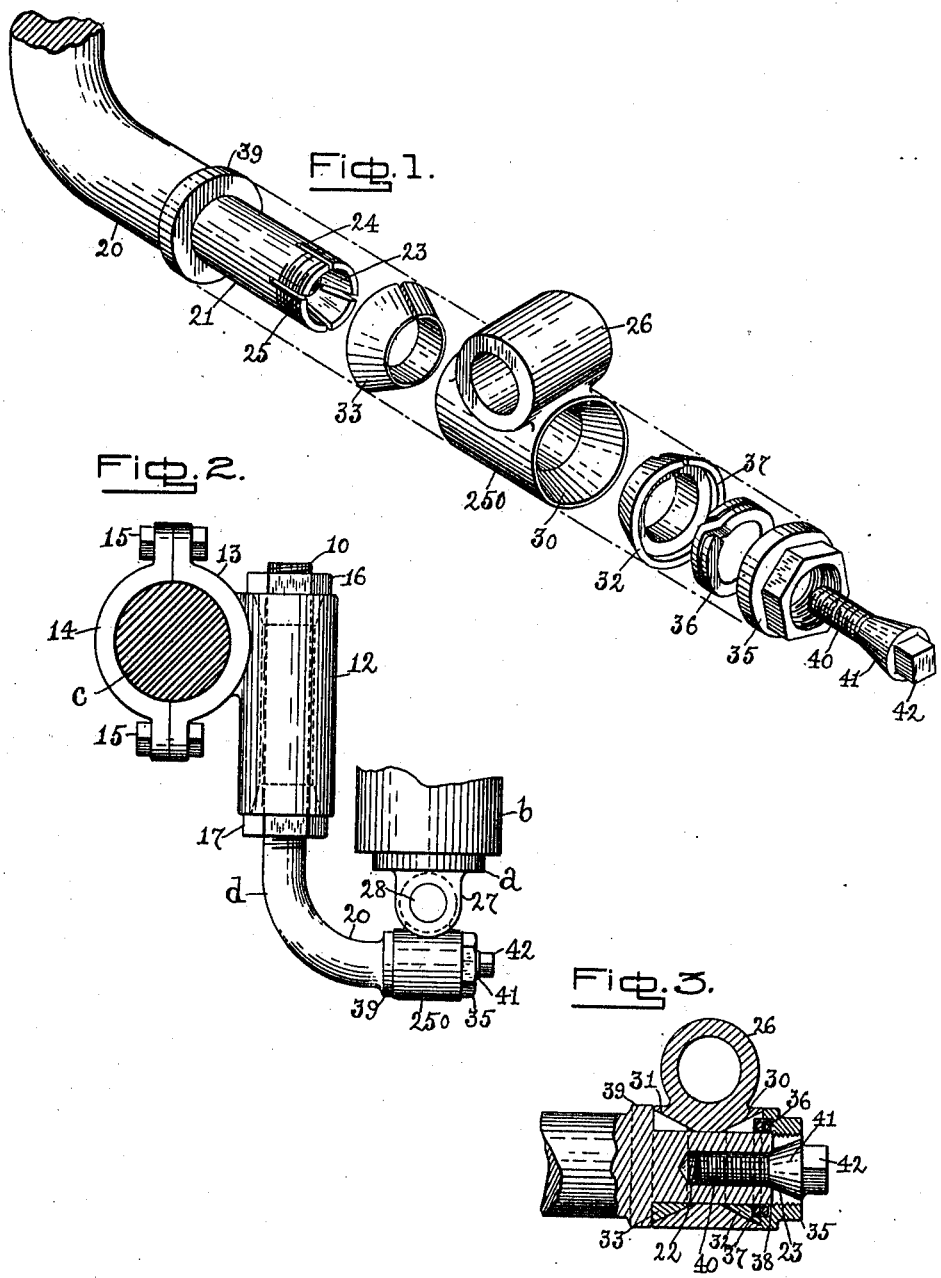
Witnesses:
M. S. Crozier
J. Murphy
Inventor.
Charles F. Fernald
by Jas. H. Churchill
atty.

UNITED STATES PATENT OFFICE.

CHARLES F. FERNALD, OF BOSTON, MASSACHUSETTS, ASSIGNOR TO KILGORE MANUFACTURING COMPANY, OF BOSTON, MASSACHUSETTS, A CORPORATION OF MAINE.

CLAMPING MECHANISM.

988,988.  Specification of Letters Patent.  Patented Apr. 11, 1911.

Application filed May 21, 1910. Serial No. 562,644.

*To all whom it may concern:*

Be it known that I, CHARLES F. FERNALD, a citizen of the United States, residing in Boston, county of Suffolk, and State of Massachusetts, have invented an Improvement in Clamping Mechanism, of which the following description, in connection with the accompanying drawings, is a specification, like letters on the drawings representing like parts.

This invention relates to a clamping mechanism for securing a normally loose sleeve in fixed relation to a shaft, and is herein shown as embodied in a hanger for supporting one member of a shock absorbing device employed on automobiles.

The present invention has for its object to provide simple and efficient means for firmly clamping or securing the sleeve on the hanger so as to avoid lost motion and consequent rattle or noise, while providing for easy and quick adjustment of the sleeve with relation to the member of the shock absorber.

These and other features of this invention will be pointed out in the claims at the end of this specification.

Figure 1 is an exploded view in perspective of a sufficient portion of a hanger provided with a clamping mechanism embodying this invention. Fig. 2, an elevation of the hanger and clamping mechanism shown in Fig. 1, assembled in operative relation, and showing also a portion of a shock absorber, and Fig. 3, a detail in section to be referred to.

Referring to the drawing, $a$, $b$, Fig. 2, represent the members of a shock absorber, one member of which as $a$ is designed to be attached to the axle $c$ of the automobile or other vehicle, and the other member $b$ of which is designed to be attached to the vehicle body (not shown) in a manner well understood. In the present instance, the member $a$ is attached to a hanger $d$, which is provided with a threaded arm 10, extended loosely through a sleeve or hollow boss 12 secured to or forming part of a clip 13, which coöperates with a clip 14 and is secured thereto by the bolts or screws 15 to secure the sleeve or boss 12 to the axle $c$. The threaded arm 10 is loosely extended through the sleeve or hollow boss 12 and is longitudinally adjustable therein, it being secured in its adjusted position by externally tapered nuts 16, 17, which engage tapered seats in the opposite ends of the hollow boss or sleeve 12. The construction as thus far described is not herein claimed.

The present invention relates more particularly to the mechanism for attaching the member $a$ of the shock absorber to the hanger $d$, whereby said attachment may be quickly and easily made and allow for the proper positioning of the member $a$ with relation to the member $b$, and also provide against wear, rattle or noise. To this end, the hanger $d$ is provided with an arm 20 extended at an angle to the arm 10 and having a cylindrical extension 21, which is provided with a socket comprising a screw-threaded cylindrical portion 22 and an enlarged tapered end portion 23, the walls of which are provided with one or more longitudinally extended slots 24 and with external screw-threads 25. The cylindrical extension 21 has fitted upon it a sleeve 250 provided with a hollow boss 26, which extends transversely of said sleeve and is designed to be secured between ears 27 on the member $a$ by a pivot bolt or screw 28. The sleeve 250 is provided on its inner circumference at its opposite ends with cone-shaped or tapering portions 30, 31, with which coöperate split cones 32, 33, loosely fitted onto the cylindrical extension 21 which forms practically one form of hollow shaft. The cones 32, 33 coöperate with the tapered seats at the opposite ends of the sleeve 250 to obtain a tight fit on the shaft, and longitudinal movement of the sleeve on the shaft is prevented by means of a nut 35 screwed upon the threaded split end 25 of said shaft, and preferably by a spring washer 36, which is fitted loosely on the hollow shaft between the nut 35 and the cone 32. The spring washer 36 is preferably of smaller external diameter than the cone 32 and nut 35 and fits into recesses 37, 38, in these parts, so that when the nut 35 is set up, it may abut against the end of the sleeve 250 and impart a neat and finished external appearance to the clamping mechanism as represented in Fig. 2. The opposite end of the sleeve 250 bears against a flange or collar 39 on the hollow shaft 21. The sleeve 250 is loosely fitted on the shaft or extension 21 and capable of longitudinal and rotary movements on the said shaft or extension, so as to adjust it with relation to the member $a$ of the shock absorber, and when properly positioned, said sleeve may be secured in fixed position on the said shaft or extension, by setting up the nut 35, which forces the split cones into firm engagement with the shaft and sleeve, and when the nut has been properly set up, to secure the sleeve in fixed relation to the shaft in the desired or proper position, the sleeve is locked in this position by an expanding device, which comprises a threaded portion 40 to engage the threaded portion 22 of the hollow shaft or extension 21 and a tapered end portion or cone 41, which coöperates with the internally tapered split end portion 23 of the hollow shaft, said expanding device being provided as shown with an angular head 42, which is designed to be engaged by a wrench or other tool. It will thus be seen, that as the threaded portion 40 of the expanding device is screwed into the threaded portion 22 of the hollow shaft or extension 21, the cone 41 coöperates with the conical inner surface 23 of the split end of the said shaft, and expands the latter outwardly into firm engagement with the nut 35, thereby locking the latter and the sleeve 250 in their adjusted position on the hollow shaft.

The clamping mechanism herein shown is especially useful for attaching a shock absorber to the hanger d, but it is not desired to limit the invention in this respect.

Claims.

1. The combination with a hanger having a hollow cylindrical extension provided with internal screw-threads and with a split end portion having external screw-threads and tapering inner walls, of a sleeve fitted loosely on said hollow extension and provided with tapered end portions on its interior, cone washers on said extension coöperating with the tapered end portions of said sleeve, a nut to engage the externally threaded split end portion of said extension, a spring washer interposed between said nut and sleeve, and an expanding device provided with a threaded portion to engage the internally threaded portion of the hollow extension and with a tapered portion to engage the internally tapered split portion of the hollow extension, substantially as described.

2. The combination with a hanger having a hollow extension provided with internal screw-threads and with a split end portion having external screw-threads and tapering inner walls, of a sleeve loosely fitted on said hollow extension and provided with tapered end portions on its interior, cones on said hollow extension coöperating with the tapered end portions of said sleeve, a nut to engage the externally threaded split end portion of said extension, and an expanding device provided with a threaded portion to engage the internally threaded portion of the hollow extension and with a tapered portion to engage the tapering inner walls of said extension, substantially as described.

3. The combination with a hanger having a hollow extension, a sleeve loosely fitted on said extension and provided at its opposite ends with conical portions on the interior thereof, split cones on said shaft coöperating with the said conical portions, means to force the cones into effective engagement with said conical portions and thereby secure said sleeve in fixed relation to said shaft, and means coöperating with the interior surface of the hollow extension to lock said forcing means in fixed position on said extension, substantially as described.

4. The combination with a hollow shaft provided with internal screw-threads and with a split end portion having external screw-threads and tapering inner walls, of a sleeve fitted loosely on said hollow shaft and provided with tapered end portions on its interior, cone washers on said hollow shaft coöperating with the tapered end portions of said sleeve, a nut to engage the externally threaded split end portion of said hollow shaft, a spring washer interposed between said nut and sleeve, and an expanding device provided with a threaded portion to engage the internally threaded portion of the hollow shaft, and with a tapered portion to engage the tapering inner walls of the hollow shaft, substantially as described.

5. The combination with a shaft having a flange and a threaded end, a sleeve loosely fitted on said shaft and provided at its opposite ends with tapering portions on its interior, a split cone on said shaft interposed between said flange and one end of the sleeve, a split cone on said shaft coöperating with the other end of said sleeve, and a nut to engage the threaded end of the shaft and coöperating with said flange to force the cones into engagement with the sleeve and shaft and thereby secure the said sleeve in fixed position on said shaft, substantially as described.

In testimony whereof, I have signed my name to this specification in the presence of two subscribing witnesses.

CHARLES F. FERNALD.

Witnesses:
JAS. H. CHURCHILL,
J. M. MURPHY.